(12) United States Patent
Inada

(10) Patent No.: US 11,772,490 B2
(45) Date of Patent: Oct. 3, 2023

(54) ONBOARD EQUIPMENT OPERATING DEVICE

(71) Applicant: TOYOTA JIDOSHA KABUSHIKI KAISHA, Aichi-ken (JP)

(72) Inventor: Tomohiro Inada, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 24 days.

(21) Appl. No.: 17/088,593

(22) Filed: Nov. 4, 2020

(65) Prior Publication Data

US 2021/0188087 A1 Jun. 24, 2021

(30) Foreign Application Priority Data

Dec. 24, 2019 (JP) ................................ 2019-233249

(51) Int. Cl.
*G06F 3/0487* (2013.01)
*B60K 35/00* (2006.01)
(Continued)

(52) U.S. Cl.
CPC .............. *B60K 35/00* (2013.01); *B60R 11/04* (2013.01); *B62D 1/046* (2013.01);
(Continued)

(58) Field of Classification Search
CPC ..... G06F 3/00; G06F 3/01; G06T 1/00; G06T 7/20; H04Q 9/00; B60K 35/00;
(Continued)

(56) References Cited

U.S. PATENT DOCUMENTS

| 2004/0176906 A1* | 9/2004 | Matsubara | G01C 21/3691 340/995.19 |
| 2015/0345981 A1* | 12/2015 | Goldman-Shenhar | G10L 25/48 701/533 |

(Continued)

FOREIGN PATENT DOCUMENTS

| JP | H5270296 A | 10/1993 |
| JP | 2004171476 A * | 6/2004 |

(Continued)

*Primary Examiner* — Patrick E Demosky
(74) *Attorney, Agent, or Firm* — HAUPTMAN HAM, LLP

(57) ABSTRACT

An onboard equipment operating device includes a memory, a processor, a display unit, an operation unit, and an in-cabin camera. The display unit displays information regarding onboard equipment, instruction to the onboard equipment displayed at the display unit is configured to be received as a result of manual operation of the operation unit. The in-cabin camera captures images of a vehicle occupant. The processor is configured to: detect a predetermined action from actions of a face or a body of the vehicle occupant, the actions of the face or the body of the vehicle occupant being imaged by the in-cabin camera; input an instruction corresponding to the predetermined action to the onboard equipment; and display the information regarding the onboard equipment in an operatable state at the display unit, in a case in which the instruction corresponding to the predetermined action has been input to the onboard equipment.

9 Claims, 6 Drawing Sheets

(51) Int. Cl.
*B60R 11/04* (2006.01)
*B62D 1/04* (2006.01)
*G01C 21/36* (2006.01)
*G06V 20/59* (2022.01)
*G06V 40/20* (2022.01)
*G06V 40/16* (2022.01)
*B60R 11/00* (2006.01)

(52) U.S. Cl.
CPC ......... *G01C 21/3664* (2013.01); *G06V 20/59* (2022.01); *G06V 40/174* (2022.01); *G06V 40/28* (2022.01); *B60K 2370/119* (2019.05); *B60K 2370/1464* (2019.05); *B60K 2370/152* (2019.05); *B60K 2370/157* (2019.05); *B60K 2370/161* (2019.05); *B60K 2370/21* (2019.05); *B60R 2011/0003* (2013.01)

(58) Field of Classification Search
CPC ...... B60K 2370/161; B60K 2370/1464; B60K 2370/152; B60K 2370/119; B60K 2370/157; B60K 2370/21; G06V 20/59; G06V 40/174; G06V 40/28; B60R 11/04; B60R 2011/0003; B62D 1/046; G01C 21/3664

See application file for complete search history.

(56) References Cited

U.S. PATENT DOCUMENTS

| | | | |
|---|---|---|---|
| 2016/0107654 A1* | 4/2016 | Tan | B60W 50/08 701/36 |
| 2017/0192629 A1* | 7/2017 | Takada | G06F 3/0304 |
| 2018/0059798 A1 | 3/2018 | Matsubara et al. | |
| 2020/0202855 A1 | 6/2020 | Kozono et al. | |
| 2021/0072831 A1* | 3/2021 | Edwards | G06F 3/013 |
| 2021/0101540 A1* | 4/2021 | Czarnecki | B60R 1/12 |
| 2022/0038909 A1* | 2/2022 | Mendelowitz | H04W 4/80 |

FOREIGN PATENT DOCUMENTS

| | | |
|---|---|---|
| JP | 201652861 A | 4/2016 |
| JP | 2016153250 A | 8/2016 |
| JP | 202097378 A | 6/2020 |

* cited by examiner

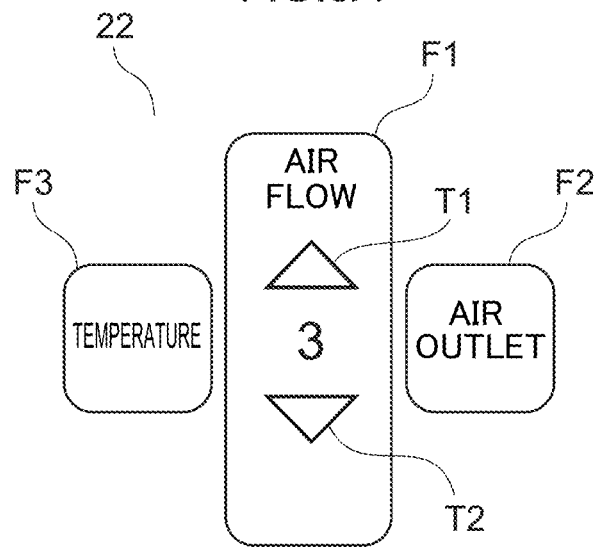
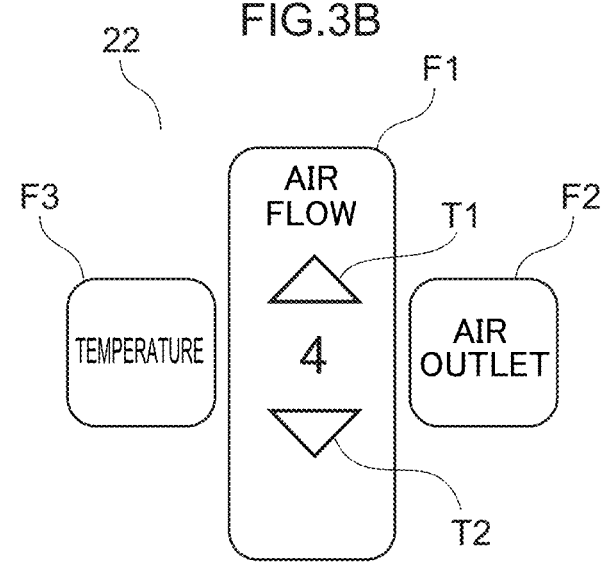

ONBOARD EQUIPMENT OPERATING DEVICE

CROSS-REFERENCE TO RELATED APPLICATION

This application is based on and claims priority under 35 USC 119 from Japanese Patent Application No. 2019-233249 filed on Dec. 24, 2019, the disclosure of which is incorporated by reference herein.

BACKGROUND

Technical Field

The present disclosure relates to an onboard equipment operating device.

Related Art

Japanese Patent Application Laid-Open (JP-A) No. 2016-052861 discloses an onboard equipment operating device that detects a gesture of a finger in a region that is in the periphery of the steering wheel, and recognizes that gesture as information for operating onboard equipment.

However, the onboard equipment operating device of above-described JP-A No. 2016-052861 only processes cases in which a simple operation is carried out, such as turning a turn signal switch on/off, turning the headlight switch on/off, turning the wiper device on/off or the like, and there is room for improvement in efficiently carrying out operations with respect to onboard equipment that require fine adjustment, such as the air conditioner or the like.

SUMMARY

In view of the above-described circumstances, an object of the present disclosure is to provide an onboard equipment operating device that can efficiently carry out operation of onboard equipment that requires fine adjustment.

An onboard equipment operating device of a first aspect of the present disclosure includes a memory, a processor coupled to the memory, a display unit, an operation unit, and an in-cabin camera. The display unit displays information regarding onboard equipment, instruction to the onboard equipment displayed at the display unit is configured to be received as a result of manual operation of the operation unit, and the in-cabin camera captures images of a vehicle occupant. The processor is configured to: detect a predetermined action from at least one of an action of a face of the vehicle occupant or an action of a body of the vehicle occupant, the action of the face of the vehicle occupant and the action of the body of the vehicle occupant being imaged by the in-cabin camera; input an instruction corresponding to the predetermined action to the onboard equipment; and display the information regarding the onboard equipment in an operatable state at the display unit in a case in which the instruction corresponding to the predetermined action has been input to the onboard equipment.

In the onboard equipment operating device of the first aspect of the present disclosure, information regarding onboard equipment is displayed on the display unit. An instruction to the onboard equipment that is displayed on the display unit can be received as a result of manual operation of the operation unit. Images of the vehicle occupant are captured by the in-cabin camera. The processor detects a predetermined action from at least one of an action of the face of the vehicle occupant or an action of the body of the vehicle occupant, the actions of the face and the body of the vehicle occupant being imaged by the in-cabin camera. The processor inputs an instruction corresponding to the predetermined action to the onboard equipment. Due thereto, an instruction can be input to the onboard equipment by the vehicle occupant moving at least one of his face or body without the vehicle occupant manually inputting an instruction by using the operation unit.

Further, the processor displays, on the display unit, information regarding the onboard equipment in an operatable state in a case in which the instruction corresponding to the predetermined action has been input to the onboard equipment. Due thereto, after an instruction to the onboard equipment is input by the vehicle occupant moving at least one of his face or body, instruction for fine adjustment of the setting of the onboard equipment, or the like, can be received by the vehicle occupant contiguously carrying out operation of the operation unit. Note that the action of the face here is not limited to an action of the entire face, and broadly encompasses actions of moving the sight line direction and opening/closing the eyelids.

In an onboard equipment operating device of a second aspect of the present disclosure, in the onboard equipment operating device of the first aspect, in a case in which the processor has input the instruction corresponding to the predetermined action to the onboard equipment, the processor notifies the vehicle occupant that the instruction to the onboard equipment has been input.

In the onboard equipment operating device of the second aspect of the present disclosure, in a case in which the processor has input the instruction to the onboard equipment, the vehicle occupant is notified that the instruction to the onboard equipment has been input. Due thereto, the vehicle occupant can, without carrying out a special operation, know that the instruction to the onboard equipment has been input. Note that what is called "the instruction to the onboard equipment has been input" here includes at least one of situations at which an instruction is received by the vehicle occupant operating the operation unit, and at which an instruction is input to the onboard equipment by an action of the vehicle occupant.

In an onboard equipment operating device of a third aspect of the present disclosure, in the onboard equipment operating device of the second aspect, the processor notifies, by sound, the vehicle occupant that the instruction to the onboard equipment has been input.

In the onboard equipment operating device of the third aspect, as compared with a structure that gives notice that the instruction has been input by display on the display unit, the vehicle occupant can understand that the instruction has been input without moving his sight line toward the display unit.

In an onboard equipment operating device of a fourth aspect of the present disclosure, in the onboard equipment operating device of any one of the first aspect through the third aspect, the operation unit is a steering wheel switch that is provided at a steering wheel.

In the onboard equipment operating device of the fourth aspect of the present disclosure, the steering wheel switch is provided at the steering wheel. An instruction can be input to the onboard equipment by the vehicle occupant operating the steering wheel switch.

In an onboard equipment operating device of a fifth aspect of the present disclosure, in the onboard equipment operating device of any one of the first aspect through the fourth aspect, the processor detects an action, which includes a predetermined hand gesture, from actions of the vehicle occupant, the actions being imaged by the in-cabin camera, and the processor inputs an instruction corresponding to the detected action including the predetermined hand gesture to the onboard equipment.

In the onboard equipment operating device of the fifth aspect of the present disclosure, the processor detects an action that includes a predetermined hand gesture of the vehicle occupant from the actions captured by the in-cabin camera. Then, the processor inputs an instruction corresponding to the detected action including the predetermined hand gesture to the onboard equipment.

In an onboard equipment operating device of a sixth aspect of the present disclosure, in the onboard equipment operating device of any one of the first aspect through the fifth aspect, the processor detects an action, which includes a predetermined sight line movement pattern, from actions of a face of the vehicle occupant, the actions being imaged by the in-cabin camera, and the processor inputs an instruction corresponding to the detected action including the predetermined sight line movement pattern to the onboard equipment.

In the onboard equipment operating device of the sixth aspect of the present disclosure, the processor detects an action that includes a predetermined sight line movement pattern of the vehicle occupant from the images captured by the in-cabin camera. Then, the processor inputs an instruction corresponding to the detected action including the predetermined sight line movement pattern to the onboard equipment.

In an onboard equipment operating device of a seventh aspect of the present disclosure, in the onboard equipment operating device of any one of the first aspect through the sixth aspect, the onboard equipment includes at least one of an air conditioner, an audio system, and a navigation system.

In the onboard equipment operating device of the seventh aspect of the present disclosure, the processor detects a predetermined action from actions of at least one of the face and the body of the vehicle occupant who is imaged by the in-cabin camera, and inputs an instruction corresponding to the detected action to the air conditioner, the audio system, the navigation system, or the like. Further, due to the processor displaying information of the air conditioner, the audio system, the navigation system, or the like on the display unit in an operatable state, the vehicle occupant can contiguously carry out fine adjustment of the settings of these onboard equipment by operating the operation unit.

In an onboard equipment operating device of an eighth aspect of the present disclosure, in the onboard equipment operating device of any one of the first aspect through the seventh aspect, an additional instruction to the onboard equipment, which has been displayed in the operatable state at the display unit by the processor, is configured to be received as a result of the vehicle occupant manually operating the operation unit.

In the onboard equipment operating device of the eighth aspect of the present disclosure, an additional instruction for fine adjustment of the settings of the onboard equipment, which has been displayed in the operatable state by the processor, is received as a result of the vehicle occupant manually operating the operation unit.

As described above, in accordance with the onboard equipment operating device of the first aspect of the present disclosure, operation of onboard equipment that requires fine adjustment can be carried out efficiently.

In accordance with the onboard equipment operating device of the second aspect of the present disclosure, the vehicle occupant can confirm that an instruction to the onboard equipment has been input.

In accordance with the onboard equipment operating device of the third aspect of the present disclosure, the vehicle occupant can comfortably input an instruction.

In accordance with the onboard equipment operating device of the fourth aspect of the present disclosure, the vehicle occupant can input an instruction to the onboard equipment, without taking his hands off the steering wheel while driving.

In accordance with the onboard equipment operating device of the fifth aspect of the present disclosure, an instruction can be input to onboard equipment merely with a gesture by the vehicle occupant moving his hand.

In accordance with the onboard equipment operating device of the sixth aspect of the present disclosure, an instruction can be input to onboard equipment with a sight line movement by the vehicle occupant without the vehicle occupant moving his hand.

In accordance with the onboard equipment operating device of the seventh aspect of the present disclosure, operation of onboard equipment such as the air conditioner, the audio system, the navigation system or the like can be carried out efficiently.

In accordance with the onboard equipment operating device of the eighth aspect of the present disclosure, operation for fine adjustment of onboard equipment can be carried out efficiently.

BRIEF DESCRIPTION OF THE DRAWINGS

Exemplary embodiments of the present invention will be described in detail based on the following figures, wherein:

FIG. 3A shows another example of an image displayed on the display unit in the embodiment, and shows a state in which an air flow is set to 3;

FIG. 3B shows another example of an image displayed on the display unit in the embodiment, and shows a state in which the air flow is set to 4;

DETAILED DESCRIPTION

Figure 1:
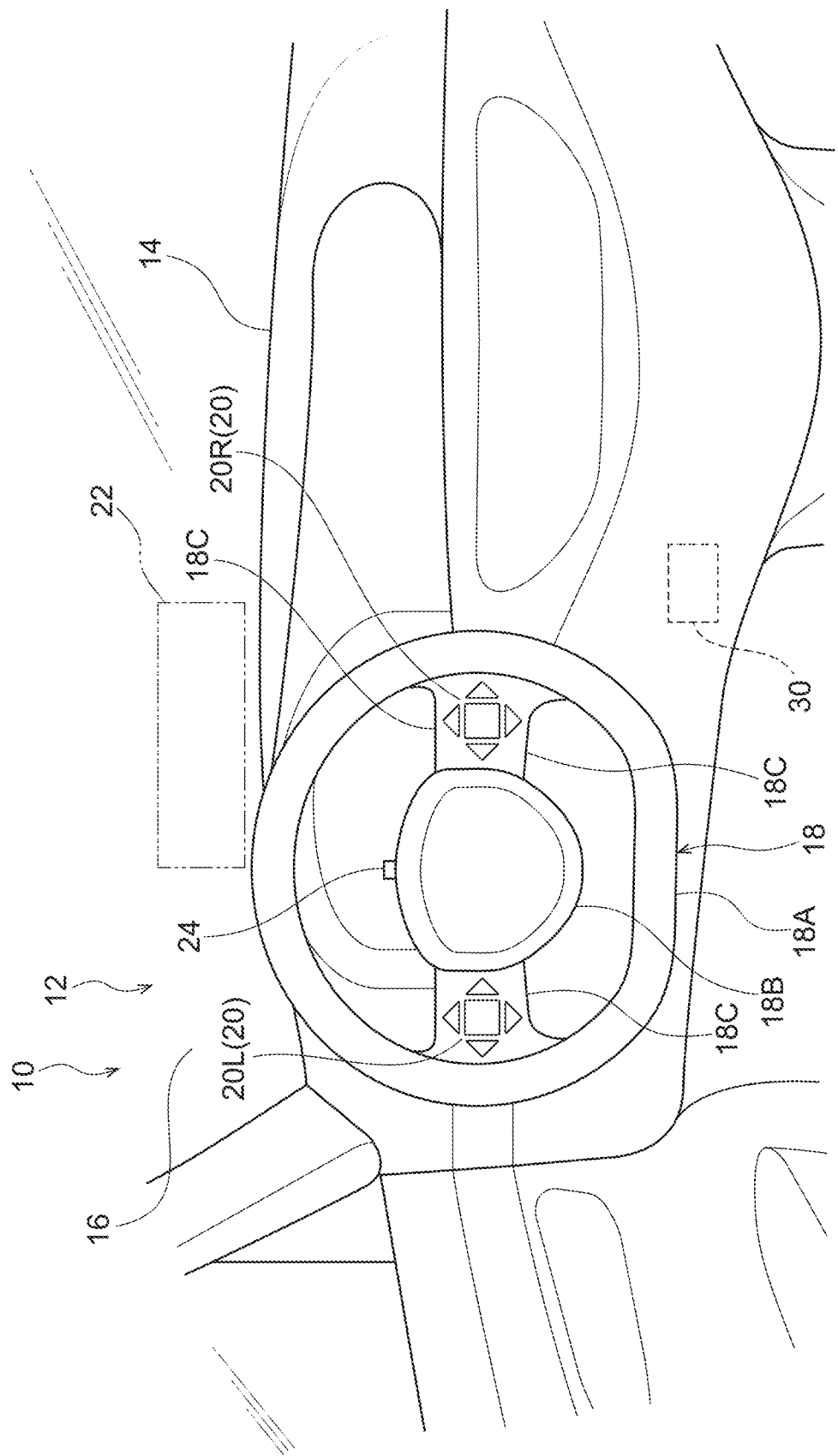
FIG. 1 represents a front portion of a passenger compartment of a vehicle, to which an onboard equipment operating device relating to an embodiment is applied, shown from a vehicle rear side.

An onboard equipment operating device 12 relating to an embodiment is described with reference to the drawings. As shown in FIG. 1, an instrument panel 14 is disposed at a front portion of a passenger compartment of a vehicle 10 to which the onboard equipment operating device 12 is applied. A windshield glass 16 is disposed at a front end portion of the instrument panel 14. The windshield glass 16 extends in a vehicle vertical direction and a vehicle transverse direction, and divides a passenger compartment interior and a passenger compartment exterior.

Figure 4:
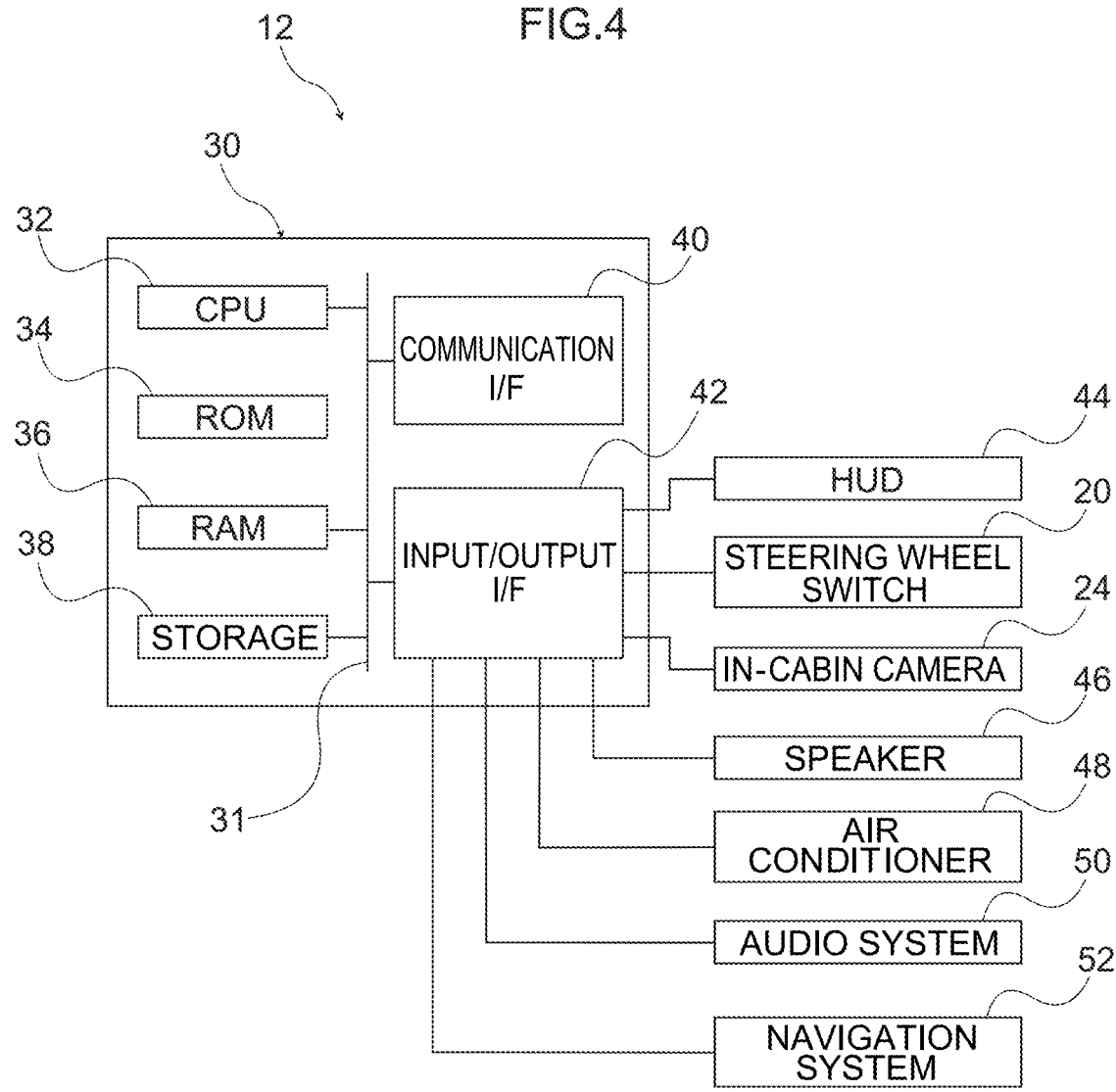
FIG. 4 is a block diagram showing hardware structures of the onboard equipment operating device relating to the embodiment.

A display region 22 that serves as a display unit is set at the windshield glass 16. The display region 22 is a region at which images are projected onto the windshield glass 16 from a head-up display 44 that is shown in FIG. 4. The display region 22 is set at the windshield glass 16 at the vehicle front side of the driver's seat. Information including onboard equipment is displayed at the display region 22.

A steering wheel 18 is provided via an unillustrated steering column at a vehicle left side of the instrument panel 14. The steering wheel 18 has a rim portion 18A that is substantially annular. A hub portion 18B that structures the central portion is provided at an inner peripheral side of the rim portion 18A. The rim portion 18A and the hub portion 18B are connected by plural spoke portions 18C. In the present embodiment, as an example, the rim portion 18A and the hub portion 18B are connected by two spoke portions 18C.

The spoke portions 18C are provided at two places that are right side and left side of the hub portion 18B and between the rim portion 18A and the hub portion 18B. Here, a right side switch 20R that serves as an operation unit is provided at the spoke portion 18C that is shown at right side of the hub portion 18B in FIG. 1. Further, a left side switch 20L that serves as an operation unit is provided at the spoke portion 18C that is shown at left side of the hub portion 18B. Note that, in the following explanation, when there is no need to distinguish between the right side switch 20R and the left side switch 20L, they are simply called the "steering wheel switch 20". Details of the steering wheel switch 20 are described later.

(Hardware Structures) FIG. 4 is a block diagram showing hardware structures of the onboard equipment operating device 12. As shown in FIG. 4, the onboard equipment operating device 12 has an ECU (Electrical Control Unit) 30 that is a control section. Further, the ECU 30 is structured to include a CPU (Central Processing Unit: processor) 32, a ROM (Read Only Memory) 34, a RAM (Random Access Memory) 36, a storage 38, a communication interface 40 and an input/output interface 42. These respective structures are connected so as to be able to communicate with one another via a bus 31.

The CPU 32 is a central computing processing unit, and executes various programs and controls various sections. Namely, the CPU 32 reads-out programs from the ROM 34 or the storage 38, and executes the programs by using the RAM 36 as a workspace. The CPU 32 carries out control of the above-described respective structures and various computing processing in accordance with programs recorded in the ROM 34 or the storage 38.

The ROM 34 stores various programs and various data. The RAM 36 temporarily stores programs and data as the workspace. The storage 38 is structured by an HDD (Hard Disk Drive) or an SSD (Solid State Drive), and stores various programs including the operating system, and various data.

The communication interface 40 is an interface for the ECU 30 to communicate with a server and other equipment, and, for example, Ethernet®, FDDI, Wi-Fi® or the like are used therefor.

The HUD (head-up display) 44, the steering wheel switches 20, an in-cabin camera 24, a speaker 46, an air conditioner 48, an audio system 50 that serves as onboard equipment, and a navigation system 52 that serves as onboard equipment are connected to the input/output interface 42. Concretely, the HUD 44, which projects images onto the display region 22, is connected to the input/output interface 42, and receives signals from the ECU 30, and images are projected onto the display region 22 from the HUD 44.

Figure 2A:
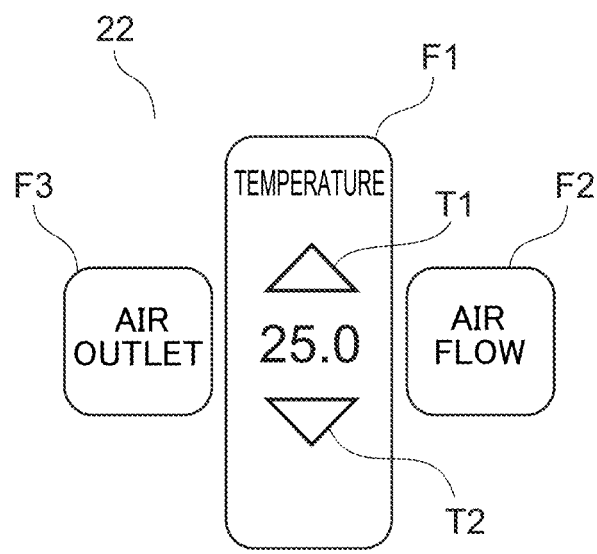
FIG. 2A shows an example of an image displayed on a display unit in the embodiment, and shows a state in which a temperature is set to 25°.

As shown in FIG. 1, each of the right side switch 20R and the left side switch 20L is structured to include a button that is provided at the center and buttons that are provided above, below, and at the left and the right of this button. Due to these buttons being operated, instructions can be inputted manually to the onboard equipment that is displayed at the display region 22. For example, as shown in FIG. 2A, in a case in which an image relating to a set temperature of the air conditioner 48 that serves as onboard equipment is displayed at the display region 22, due to the vehicle occupant pressing the upper button of the right side switch 20R, the set temperature is raised. Conversely, due to the vehicle occupant pressing the lower button of the right side switch 20R, the set temperature is lowered. Note that instructions to another onboard equipment can be inputted by operating the left side switch 20L.

Examples of images that are displayed at the display region 22 are described here with reference to FIG. 2A through FIG. 3B. As shown in FIG. 2A and FIG. 2B, a central frame-shaped portion F1, which is substantially rectangular and whose length direction is along the vertical direction, is displayed at the display region 22. A right frame-shaped portion F2 that is substantially rectangular is displayed at the right side of the central frame-shaped portion F1, and a left frame-shaped portion F3 that is substantially rectangular is displayed at the left side of the central frame-shaped portion F1.

The right frame-shaped portion F2 and the left frame-shaped portion F3 are positioned at the vertical direction intermediate portion of the central frame-shaped portion F1, and the vertical direction lengths and the left-right direction lengths thereof are substantially the same.

Here, "Temperature" is displayed at an upper portion of and at the inner side of the central frame-shaped portion F1, and shows that a screen for setting the temperature of the air conditioner 48 is displayed. Further, "25.0" is displayed at the inner side of the central frame-shaped portion F1, and shows that the current set temperature is 25.0°. Moreover, a triangular icon T1 whose apex is at the upper side is displayed at the upper side of the set temperature display portion, and a triangular icon T2 whose apex is at the lower side is displayed at the lower side of the set temperature display portion. These icons T1 and T2 show that the set temperature can be changed by the vehicle occupant pressing the upper button and the lower button of the steering wheel switch 20, respectively.

"Air flow" is displayed at the inner side of the right frame-shaped portion F2, and "Air outlet" is displayed at the inner side of the left frame-shaped portion F3. Therefore, due to the vehicle occupant pressing the right button of the steering wheel switch 20, display transitions to an air flow setting screen, and, due to the vehicle occupant pressing the left button of the steering wheel switch 20, display transitions to an air outlet selecting screen.

Examples of air flow setting screens of the air conditioner 48 are shown in FIG. 3A and FIG. 3B. In these air flow setting screens, "Air flow" is displayed in the upper portion of the inner side of the central frame-shaped portion F1. Further, "3" is displayed at the inner side of the central frame-shaped portion F1, and shows that the current air flow is 3. Note that the air flow has, for example, 10 levels, and the weakest air flow is 1, and the strongest air flow is 10.

As shown in FIG. 4, the in-cabin camera 24 captures images of the passenger compartment interior, and captures images of the upper body of the vehicle occupant in particular. As shown in FIG. 1, the in-cabin camera 24 is positioned above the hub portion 18B at the steering wheel 18, and is mounted to the unillustrated steering column. The images captured by the in-cabin camera 24 are sent to the ECU 30.

As shown in FIG. 4, the speaker 46 is provided within the passenger compartment, and converts a signal into a sound, and outputs the sound into the passenger compartment. The air conditioner 48, for example, blows-out air whose temperature has been adjusted into the passenger compartment. Further, the audio system 50, for example, plays-back music and outputs music from the speaker 46. The navigation system 52, for example, displays the route to the destination of the vehicle 10.

(Functional Structures) The onboard equipment operating device 12 realizes various functions by using the hardware resources shown in FIG. 4. The functional structures that are realized by the onboard equipment operating device are described with reference to FIG. 5.

Figure 5:
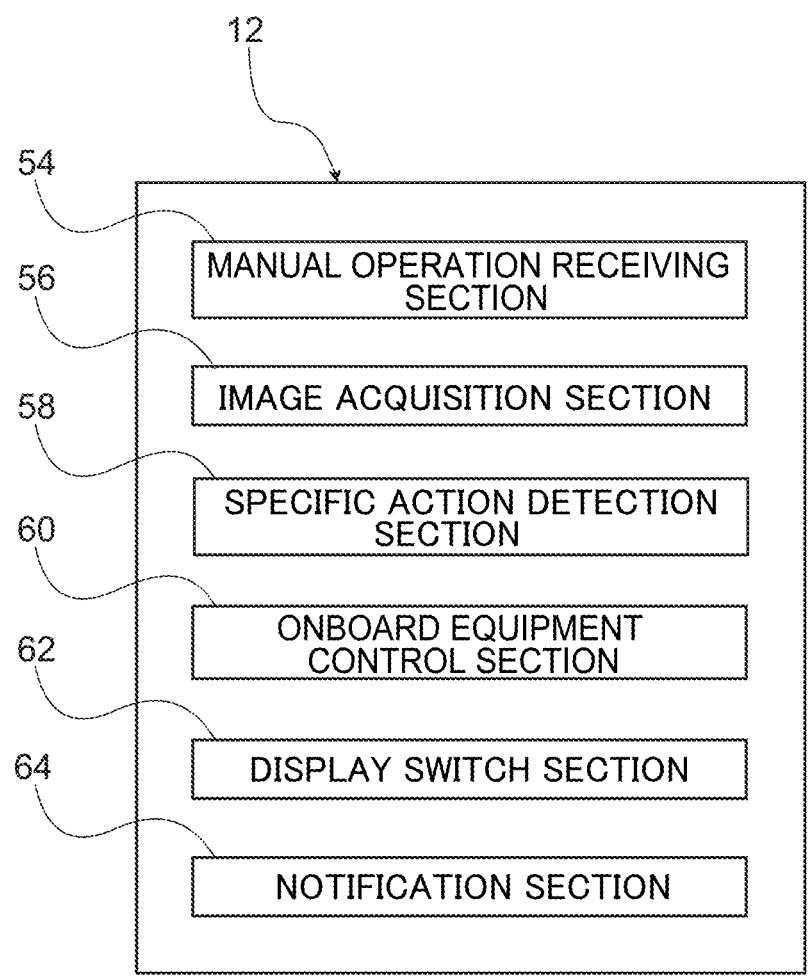
FIG. 5 is a block diagram showing functional structure of the onboard equipment operating device relating to the embodiment.

As shown in FIG. 5, the onboard equipment operating device 12 is structured to include, as the functional structures thereof, a manual operation receiving section 54, an image acquisition section 56, a specific action detection section 58, an onboard equipment control section 60, a display switching section 62, and a notifying section 64. Note that these respective functional structures are realized by the CPU 32 reading-out a program that is stored in the storage 38, and executing the program.

Due to a vehicle occupant operating the steering wheel switch 20, the manual operation receiving section 54 receives an instruction that is inputted to the air conditioner 48, the audio system 50 or the navigation system 52. Due to the instruction being received by the manual operation receiving section 54, the corresponding onboard equipment operates.

The image acquisition section 56 acquires, as image data, images that are captured by the in-cabin camera 24. The image data acquired by the image acquisition section 56 is stored, for example, in the storage 38 until a given time period elapses.

The specific action detection section 58 detects a predetermined action from actions of at least one of the face and the body of a vehicle occupant who is imaged by the in-cabin camera 24. Concretely, the specific action detection section 58 analyzes images acquired by the image acquisition section 56, and detects an action of at least one of the face and the body of the vehicle occupant. Then, the specific action detection section 58 compares the detected action and actions that are set in advance. Here, an action of the face of the vehicle occupant is, for example, a sight line movement pattern. In a case in which the sight line movement pattern is the same as a preset movement pattern, this action is detected as a predetermined action. Further, an action of the body of the vehicle occupant is, for example, a gesture of the hand. In a case in which this hand gesture is the same as a preset hand gesture, the gesture is detected as a predetermined action. Note that, even in a case in which there is a difference between the action of the vehicle occupant and the preset action, if the actions are determined to be the same overall, they are detected to be the same action. Further, a threshold value for judging whether the actions are the same or not can be adjusted.

The onboard equipment control section 60 inputs, to the air conditioner 48, the audio system 50 or the navigation system 52, an instruction that corresponds to the action detected by the specific action detection section 58.

In a case in which an instruction corresponding to a predetermined action is inputted to the air conditioner 48, the audio system 50 or the navigation system 52 by the onboard equipment control section 60, the display switching section 62 displays information of that onboard equipment on the display region 22 in an operatable state. Further, at the time when an instruction is inputted to the air conditioner 48, the audio system 50 or the navigation system 52, the notifying section 64 notifies the vehicle occupant that the instruction to the onboard equipment has been input. The vehicle occupant is notified, by sound and an image, of the fact that the instruction to the onboard equipment has been input Examples of the image that is displayed in the display region 22 are described hereinafter. In a non-operating state of the air conditioner 48, if the vehicle occupant moves his hand so as to fan his face within the imaging range of the in-cabin camera 24, that action is detected by the specific action detection section 58 as a specific action. Then, the onboard equipment control section 60 operates the air conditioner 48 at the predetermined set temperature. Further, an image relating to the air conditioner 48 is displayed in the display region 22 as shown in FIG. 2A. Namely, display is switched to an image relating to the air conditioner 48 from a state in which another image is displayed. In this way, the temperature of the passenger compartment interior is lowered. Here, the current set temperature of the air conditioner 48 is displayed in the display region 22.

Figure 2B:
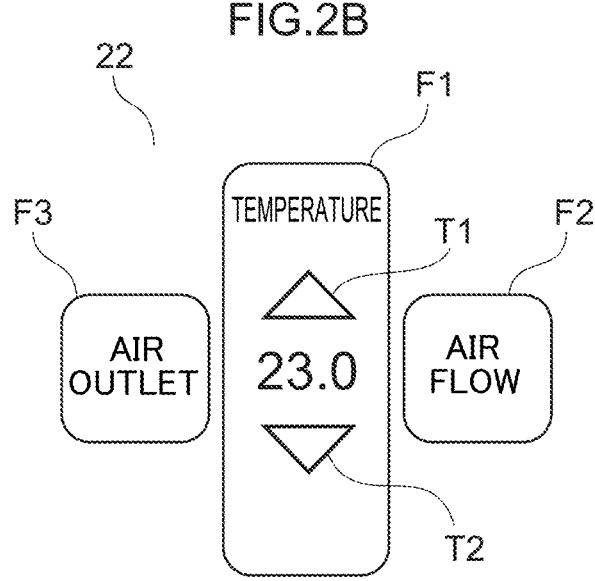
FIG. 2B shows an example of an image displayed on the display unit in the embodiment, and shows a state in which the temperature is set to 23°.

Further, in the state in which the air conditioner 48 is operating, if the vehicle occupant moves his hand so as to fan his face within the imaging range of the in-cabin camera 24, that action is detected by the specific action detection section 58 as a specific action. Then, the onboard equipment control section 60 lowers the set temperature as shown in FIG. 2B. The set temperature is lowered from 25° to 23.0°. Further, the vehicle occupant is notified that the set temperature has been changed to 23.0° by the indication displayed in the display region 22. Moreover, due to a predetermined sound being outputted from the speaker 46, the vehicle occupant is notified that the set temperature has been changed. The vehicle occupant may be notified by the outputting of a sound stating "The set temperature has been changed to 23°".

Further, an instruction is inputted to the air conditioner 48 due to the steering wheel switch 20 being operated in this state. Namely, after an instruction is inputted to the air conditioner 48 by the gesture of the hand, the set temperature of the air conditioner 48 can be changed manually. Due to the vehicle occupant pressing the upper button of the steering wheel switch 20 in the state shown in FIG. 2B, the set temperature can be changed to 24°.

Due to the steering wheel switch 20 being operated in the state shown in FIG. 2A and FIG. 2B, display is switched to the air flow setting screen and the air outlet selecting screen of the air conditioner 48. Due to the vehicle occupant pressing the right button of the steering wheel switch 20 in the state shown in FIG. 2A, the display is switched to the air flow setting screen as shown in FIG. 3A.

In the state in which the screen of FIG. 3A is displayed, due to the vehicle occupant, within the imaging range of the in-cabin camera 24, moving his hand from up to down in a state in which the palm of his hand is facing downward, that action is detected by the specific action detection section 58 as a specific action. Then, the onboard equipment control section 60 lowers the set air flow of the air conditioner 48.

Conversely, due to the vehicle occupant, within the imaging range of the in-cabin camera 24, moving his hand from down to up in a state in which the palm of his hand is facing upward, that action is detected by the specific action detection section 58 as being a specific action. Then, the onboard equipment control section 60 raises the set air flow of the air conditioner 48. Namely, display switched from that of FIG. 3A to that of FIG. 3B. Moreover, the vehicle occupant is notified that the set air flow has been changed due to a sound being outputted from the speaker 46.

Other than a hand gesture, due to the vehicle occupant changing sight lines, the specific action detection section 58 may detect that action as a specific action. For example, due to the vehicle occupant changing his sight line from up to down, the specific action detection section 58 may detect that action as a specific action.

Note that, in addition to the air conditioner 48, an instruction may similarly be inputted to the audio system 50 or the navigation system 52 by a hand gesture or a sight line movement. For example, in a state in which the audio system 50 is operating, if the vehicle occupant, within the imaging range of the in-cabin camera 24, makes a gesture like listening to a sound by moving his hand to the side of his ear, that action may be detected as a specific action by the specific action detection section 58. Then, the volume of the audio system 50 is raised by a predetermined amount, and the fact that the volume has changed is displayed in the display region 22. Moreover, due to a predetermined sound being outputted from the speaker 46, the vehicle occupant is notified that the volume has changed.

Further, for example, in a state in which the audio system 50 is operating, if the vehicle occupant moves his sight line from right to left, that action may be detected as a specific action by the specific action detection section 58. Then, the song that is being played-back by the audio system 50 may be changed to the next song, and information relating to the song that has been changed to may be displayed in the display region 22.

(Operation) Operation of the present embodiment is described next.

An example of the flow of onboard equipment operation processing by the onboard equipment operating device 12 is described with reference to the flowchart of FIG. 6. This operation processing is executed, for example, at the time when the ignition (power) of the vehicle 10 is turned on, and is carried out due to the CPU 32 reading-out a program from the ROM 34 or the storage 38, and expanding the program in the RAM 36 and executing the program. Note that the flowchart described hereinafter describes an example of the flow of onboard equipment operating processing at the time when the air conditioner 48 is operated. However, similar processing are carried out also for other onboard equipment such as the audio system 50, the navigation system 52, and the like.

Figure 6:
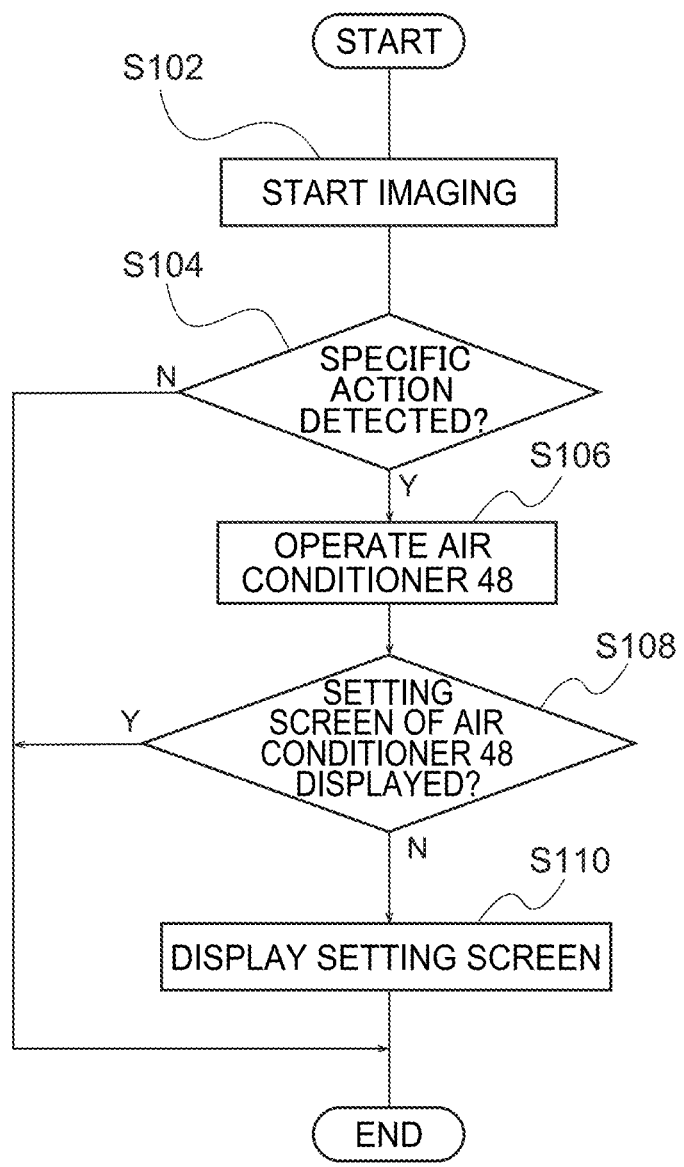
FIG. 6 is a flowchart showing an example of the flow of onboard equipment operation processing in the embodiment.

As shown in FIG. 6, in step S102, the CPU 32 starts capturing of images by the in-cabin camera 24. Next, in step S104, the CPU 32 determines whether or not a specific action has been detected. For example, the CPU 32 determines that a specific action has been detected in a case in which a predetermined action for operating the air conditioner 48 is detected by the specific action detection section 58 in accordance with a hand gesture of the vehicle occupant who is imaged by the in-cabin camera 24. Further, in a case in which a specific action is not detected from the hand gestures of the vehicle occupant who is imaged by the in-cabin camera 24, the CPU 32 determines that a specific action has not been detected.

In a case in which the CPU 32 determines in step S104 that a specific action has been detected, the CPU 32 moves on to step S106. On the other hand, in a case in which the CPU 32 determines in step S104 that a specific action has not been detected, the CPU 32 ends the onboard equipment operating processing.

In step S106, the CPU 32 operates the air conditioner 48. Concretely, the CPU 32 operates the air conditioner 48 due to an instruction, which corresponds to the action detected by the specific action detection section 58, being inputted to the air conditioner 48 by the onboard equipment control section 60.

Next, in step S108, the CPU 32 determines whether or not a setting screen of the air conditioner 48 is being displayed at the display region 22. Concretely, in a case in which a signal is received from the HUD 44, and the information that is being projected from the HUD 44 onto the display region 22 is a setting screen of the air conditioner 48, the CPU 32 determines that a setting screen of the air conditioner 48 is being displayed. On the other hand, in a case in which the information that is being projected from the HUD 44 onto the display region 22 is a screen that is other than a setting screen of the air conditioner 48, the CPU 32 determines that a setting screen of the air conditioner 48 is not being displayed.

In a case in which the CPU 32 determines in step S108 that a setting screen of the air conditioner 48 is being displayed, there is no need to switch the display, and therefore, the CPU 32 ends the onboard equipment operating processing.

Further, in a case in which the CPU 32 determines in step S108 that a setting screen of the air conditioner 48 is not being displayed, the CPU 32 moves on to the processing of step S110, and displays a setting screen of the air conditioner 48. Concretely, by the display switching section 62, the CPU 32 operates such that a setting screen of the air conditioner 48 is displayed from the HUD 44 onto the display region 22. Due to a setting screen of the air conditioner 48 being displayed at the display region 22 in this way, operation by the steering wheel switch 20 is possible.

As described above, in the onboard equipment operating device 12 of the present embodiment, the ECU 30 detects a predetermined action from actions of at least one of the face and the body of a vehicle occupant who is imaged by the in-cabin camera 24, and inputs an instruction corresponding to that action to the onboard equipment such as the air conditioner 48 or the like. Due thereto, an instruction can be inputted to onboard equipment without the vehicle occupant manually inputting an instruction by using the steering wheel switch 20. Namely, the onboard equipment can be operated, and the set value of the onboard equipment can be changed.

Further, in the present embodiment, information of onboard equipment is displayed in an operable state at the display region 22 by the ECU 30. Concretely, due to the ECU 30, the HUD 44 projects an image onto the display region 22. Due to the vehicle occupant moving at least one of his face and body, an instruction is inputted to onboard equipment, and thereafter, in continuation with the input, the vehicle occupant operates the steering wheel switch 20 such that fine adjustment of the setting of the onboard equipment, or the like, can be carried out. As a result, operation of onboard equipment that requires fine adjustment can be carried out efficiently.

Moreover, at the time when an instruction is inputted to onboard equipment, the vehicle occupant is notified, by using the speaker 46, of the fact that the instruction to the onboard equipment has been input. The vehicle occupant can, without carrying out a special operation, understand that the instruction to the onboard equipment has been input. Namely, the vehicle occupant can easily confirm that his instruction to the onboard equipment has been input. In particular, as compared with a structure in which the vehicle occupant is notified that the instruction has been input based on information that is displayed at the display region 22 being updated, the vehicle occupant can understand that the instruction has been input, without moving his sight line to the display region 22. For example, the driver can know that the instruction to the onboard equipment has been input, in a state in which the driver looks forward.

Still further, in the present embodiment, the steering wheel switches 20 are the operation unit. Therefore, an instruction can be inputted to onboard equipment due to the vehicle occupant operating the steering wheel switch 20 while the vehicle occupant remains in a state of grasping the steering wheel 18, and the vehicle occupant can comfortably input the instruction.

Further, the ECU 30 detects actions, including hand gestures of the vehicle occupant, by the specific action detection section 58, and inputs an instruction corresponding to a hand gesture to onboard equipment. Due thereto, an instruction can be inputted to onboard equipment such as the air conditioner 48 or the like merely by the vehicle occupant moving his hand.

Moreover, if the ECU 30 detects actions, including sight line movement patterns of the vehicle occupant, by the specific action detection section 58, and inputs an instruction corresponding to a sight line movement pattern to onboard equipment. Due thereto, an instruction can be inputted to onboard equipment such as the air conditioner 48 or the like, without the vehicle occupant taking his hands off the steering wheel 18 while driving.

Although an embodiment has been described above, the present disclosure can, of course, be implemented in various forms that does not depart form the scope of the disclosure. For example, in the above-described embodiment, the display region 22 that is set at the windshield glass 16 is used as the display unit. However, the present disclosure is not limited to this, and a center display or a meter display or the like that is provided at the instrument panel 14 may be used as the display unit. In addition, wearable glasses that can project images onto a predetermined display region may be used. In this case, images can be projected onto the lenses of the wearable glasses or the retinas of the vehicle occupant, and the lenses or the retinas are the display region.

Further, although the steering wheel switches 20 are used as the operation unit in the above-described embodiment, the present disclosure is not limited to this. For example, a switch at an unillustrated armrest or the like may be used. Alternatively, a switch may be provided at the instrument panel. Moreover, the steering wheel switches 20 are not limited to pressure-sensitive switches, and may be switches that are based on electrostatic capacitance.

Moreover, the above-described embodiment is structured such that the vehicle occupant is notified of the fact that an instruction has been inputted to onboard equipment, due to the image that is displayed at the display region 22 being updated, and moreover, the vehicle occupant is notified by sound. However, the present disclosure is not limited to this. For example, notification may be given to the vehicle occupant due to the steering wheel switch 20 being made to vibrate at the time when an instruction is inputted to onboard equipment by the steering wheel switch 20. Further, the vehicle occupant may be notified that an instruction has been inputted to onboard equipment due to a portion of the steering wheel 18 being made to emit light of a predetermined color. For example, in a case in which input by a hand gesture has been successfully input, a portion of the steering wheel 18 may be lit green, and, in a case in which input fails, a portion of the steering wheel 18 may be lit red. Due thereto, the vehicle occupant can intuitively know whether or not the instruction could be inputted.

Still further, the above-described embodiment describes a structure in which an instruction to onboard equipment is inputted by a hand gesture or a sight line movement, but the present disclosure is not limited to this. For example, there may be a structure in which an instruction to onboard equipment is inputted due to the vehicle occupant moving his entire face in a predetermined direction. Further, there may be a structure in which the voice emitted by the vehicle occupant is recognized, in addition to a hand gesture or a sight line movement.

Moreover, in the above embodiment, description is given by using FIG. 2A to FIG. 3B as examples of images that are displayed at the display region 22, but the present disclosure is not limited to this. For example, information of the onboard equipment may be displayed in stages. Namely, icons of all of the onboard equipment that can be operated may be displayed in a main menu screen which is a first stage, and, when one icon is selected, detailed information of the onboard equipment corresponding to that icon may be displayed as a second stage. In this case, due to a predetermined action of the vehicle occupant being detected and an instruction being inputted to the onboard equipment, the screen of the second stage that corresponds to the selected onboard equipment can be displayed at the display region 22, and operation of the onboard equipment can be carried out efficiently.

Still further, any of various types of processors other than a CPU may execute the onboard equipment operating processing that the CPU 32 executes by reading-out and executing software (a program) in the above-described embodiment. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processing such as ASICs (Application Specific Integrated Circuits) and the like, or the like. Further, the onboard equipment operating processing may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, although the storage 38 is the recording section in the above-described embodiment, the present disclosure is not limited to this. For example, a recording medium such as a CD (Compact Disk), a DVD (Digital Versatile Disk), a USB (Universal Serial Bus) memory, or the like may be used as the recording section. In this case, various programs are stored on these recording media.

What is claimed is:

1. An onboard equipment operating device, comprising:
   a memory,
   a processor coupled to the memory,
   a display unit,
   an operation unit, and an in-cabin camera, wherein
the display unit is configured to display information regarding onboard equipment,
the display unit is configured to display instruction to the onboard equipment received as a result of manual operation of the operation unit,
the in-cabin camera is configured to capture images of a vehicle occupant,
the processor is configured to:
- detect a predetermined action from at least one of an action of a face of the vehicle occupant or an action of a body of the vehicle occupant, the action of the face of the vehicle occupant and the action of the body of the vehicle occupant being imaged by the in-cabin camera,
- input a first instruction by the predetermined action to the onboard equipment,
- cause the display unit to display the information regarding the onboard equipment in an operatable state in a case in which the first instruction has been input by the predetermined action to the onboard equipment, and
- in response to the information regarding the onboard equipment in the operatable state being displayed at the display unit,
  - input a second instruction adjusting the first instruction to the onboard equipment in accordance with manual operation of the operation unit, and
  - input a third instruction by the same predetermined action to the onboard equipment, the third instruction adjusting the first instruction to change a set value of the onboard equipment.

2. The onboard equipment operating device of claim 1, wherein the processor is configured to, in response to the first instruction input to the onboard equipment, notify the vehicle occupant that the first instruction to the onboard equipment has been input.

3. The onboard equipment operating device of claim 2, wherein the processor is configured to notify, by sound, the vehicle occupant that the first instruction to the onboard equipment has been input.

4. The onboard equipment operating device of claim 1, wherein the operation unit is a steering wheel switch that is provided at a steering wheel.

5. The onboard equipment operating device of claim 1, wherein the predetermined action includes a predetermined hand gesture detected by the processor from actions of the vehicle occupant, the actions being imaged by the in-cabin camera.

6. The onboard equipment operating device of claim 1, wherein the predetermined action includes a predetermined sight line movement pattern detected by the processor from actions of the face of the vehicle occupant.

7. The onboard equipment operating device of claim 1, wherein the onboard equipment comprises at least one of an air conditioner, an audio system, or a navigation system.

8. The onboard equipment operating device of claim 1, wherein the processor is configured to,
- in response to the first instruction input to the onboard equipment, cause the display unit to display a first screen including the information regarding the onboard equipment in the operatable state, and
- in response to manual operation of the operation unit to input the second instruction to the onboard equipment in the operatable state, cause the display unit to switch the first screen to a second screen including information regarding the onboard equipment according to the second instruction.

9. The onboard equipment operating device of claim 1, wherein
- the information regarding the onboard equipment in the operatable state and displayed at the display unit includes a setting screen of the onboard equipment, and
- the processor is configured to input the third instruction by the same predetermined action to the onboard equipment to change a numerical quantity of the set value on the setting screen of the onboard equipment.

* * * * *